UNITED STATES PATENT OFFICE.

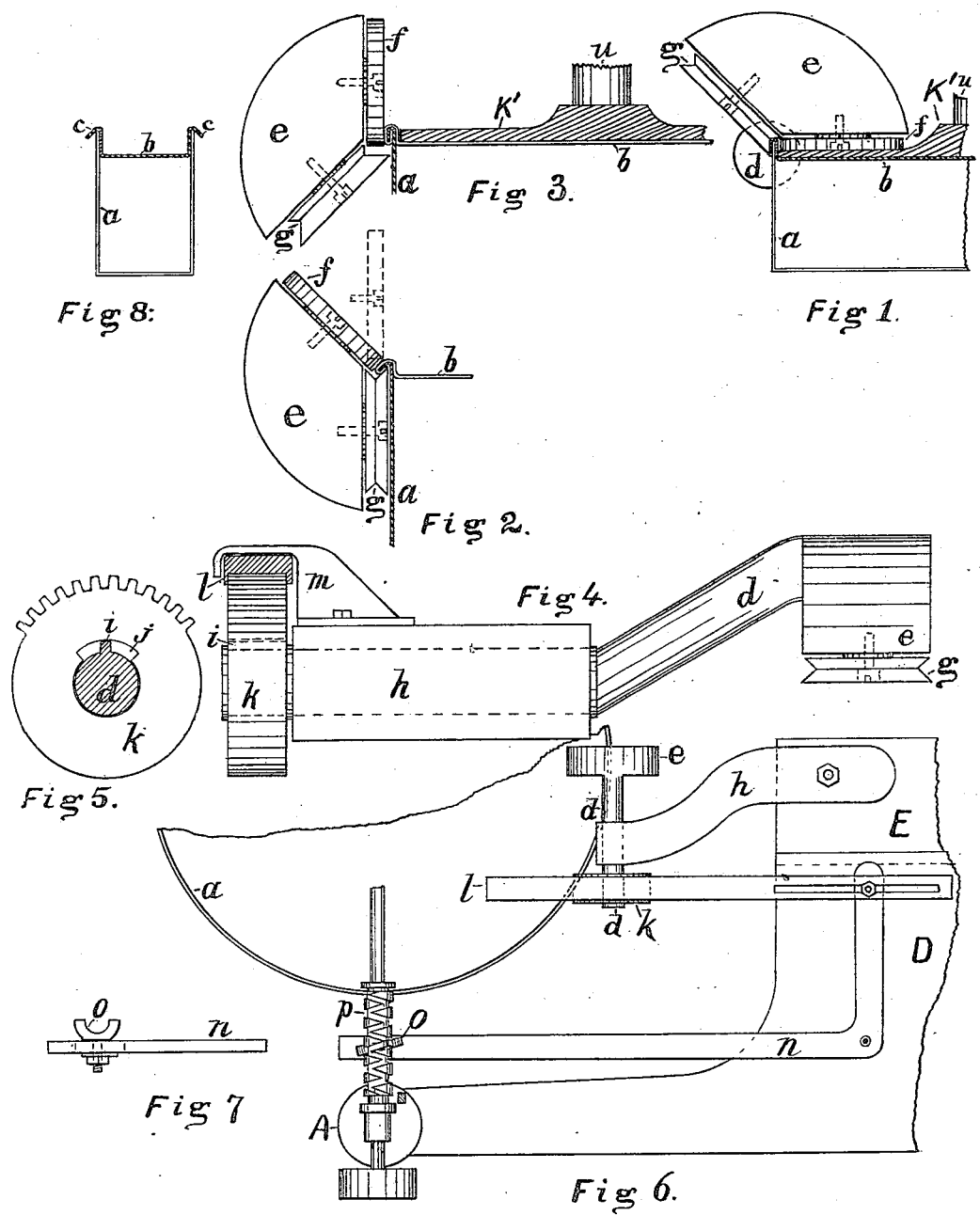

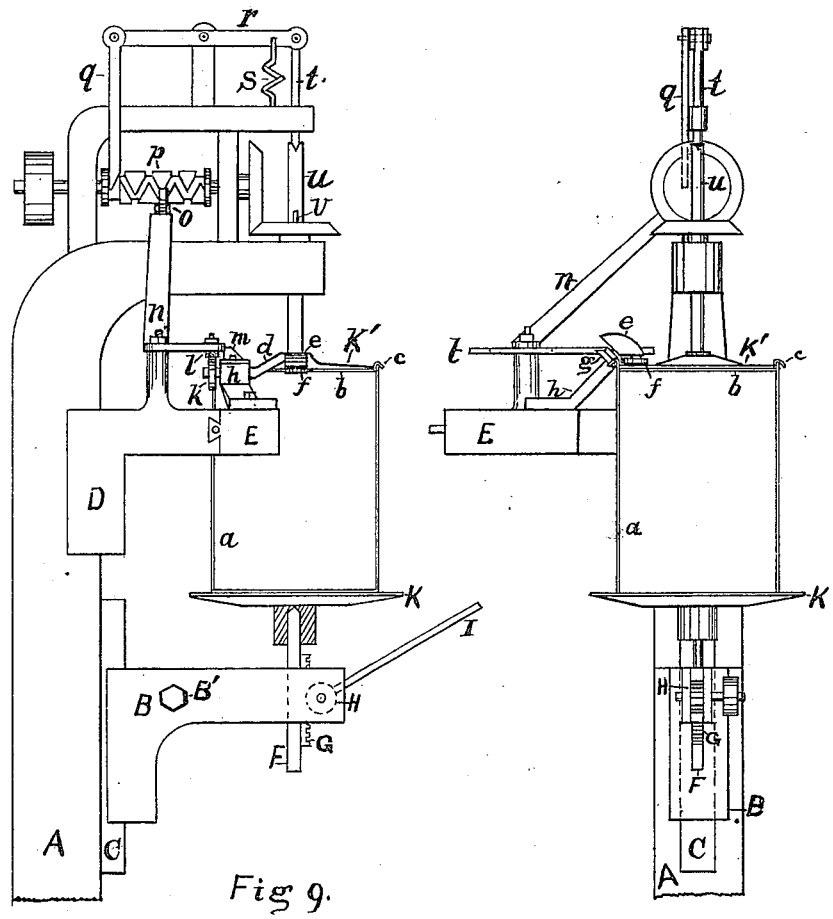
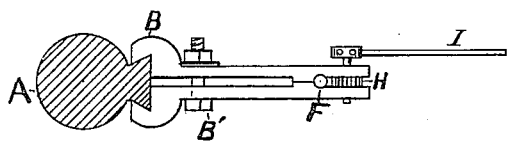
Fig 11.

FRANCIS A. WALSH, OF CHICAGO, ILLINOIS.

SEAMING-MACHINE.

SPECIFICATION forming part of Letters Patent No. 271,668, dated February 6, 1883.

Application filed August 21, 1882. (No model.)

*To all whom it may concern:*

Be it known that I, FRANCIS A. WALSH, of Chicago, in the county of Cook and State of Illinois, have invented certain new and useful Improvements in Seaming-Machines; and I hereby declare the following to be a full, clear, and exact description thereof, which will enable others skilled in the art to which my invention relates to make and use the same, reference being had to the accompanying drawings, forming a part hereof, and in which—

Figure 1 represents an end view of the head $e$ and its attached formers $f$ and $g$ at their starting-point, and the chuck K', can, and cover are shown in section and part broken away. Fig. 2 represents the head and formers $f$ and $g$ in position at the end of their travel, ready to return, and the can, with its cover, formed into a partly-finished double seam. Fig. 3 represents the head $e$ half-way back on its return and the double seam completed against the side of the wheel $f$, the can raised from the position shown in the two preceding figures, so as to press the seam against the roller $f$. Fig. 4 is a side view of the head $e$, its shaft and bracket, pinion $k$, end view of rack $l$, and bracket $m$ to hold the rack on its pinion. Fig. 5 is an end view of shaft $d$ and pinion $k$. Fig. 6 is a plan view of parts of D and E, and of all the preceding parts already shown, also the driving pulley and shaft provided with a worm, $p$, carrying a reciprocating nut, $o$, attached to the lever $n$. Fig. 7 is a side view of the outer end of the lever $n$, with its nut $o$. Fig. 8 is a central sectional elevation of a sheet-metal can and its cover as constructed before being worked in my machine. Fig. 9 is a side elevation of my seaming-machine. Fig. 10 is a front view of the same. Fig. 11 is a cross-section of the post A and plan of the bracket B.

Like letters of reference indicate like parts.

The object of my invention is to construct a machine which will make a double seam without first flanging the can or stamping the cover with a countersunk end, channel, and burr, and to that end I construct my machine as follows:

In the drawings, $a$ represents a sheet-metal can; $b$, its cover, formed or stamped, as shown, with a flange, $c$, which may be inclined at an angle more or less acute to the body of the can, as shown, or at right angles to it.

$d$ is a crooked shaft, with a head, $e$, made solid with it. The shaft is crooked, so as to be out of the way as much as possible. The under or inner faces of the head $e$ are inclined to each other, (here shown to be at an angle of one hundred and thirty-five degrees,) and to these faces are attached wheels or formers $f$ and $g$. The shaft $d$ is carried in a bracket, $h$, which is attached to an adjustable piece, E, forming a part of the table D, attached to the standard A. The piece E is dovetailed to the table D and moved by a screw in a well-known manner.

To the outer end of the shaft $d$ is attached a feather, $i$, and over it plays a pinion, $k$, out of which is cut a chamber, $j$, in which the feather $i$ plays. Upon the pinion $k$ works an adjustable rack, $l$, which is held in place over the pinion by a hook-shaped bracket, $m$, attached to the bracket $h$. The outer end of the rack $l$ is attached to a bell-crank lever, $n$, fastened to the table D, and the rack $l$ is provided with a slot, in which plays a stud on the lever $n$, as shown, and by means of which it may be adjusted. The inner or long end of the lever $n$ passes under the shaft, carrying a spiral screw provided with right and left hand grooves, in which grooves plays a nut, $o$, attached to the end of the lever $n$. Said spiral is of a well-known construction, but here so constructed with its nut that it will not work the nut until started by the rod or pusher $q$, when the nut will run to the other end of the spiral and return and come to rest. The pusher or starter $q$ is attached to a lever, $r$, fulcrumed at its center, and to its other end is attached a spring, $s$, and a rod, $t$. Said rod $t$ is conically pointed, and its point rests in and is held by the spring $s$ in a corresponding socket on the end of the shaft $u$. Said shaft $u$ is provided with a feather, $v$, which plays freely longitudinally through the horizontal bevel-gear, and to its lower end is attached a chuck, K'.

Below the chuck K' is a disk, K, parallel with it and playing freely on a spindle, F. To said spindle is also fixed a rack, G, into which plays a pinion, H, and to its shaft is attached a lever, I. The disk K and parts just described are carried on the adjustable bracket B, which, with the part C, attached to the standard A, is dovetailed, and so constructed that a bolt, B', will press together the two side pieces of the bracket and bind it and hold it in place on the part C.

The operation of this machine is as follows, to wit: The bracket B and plate K are first adjusted to the proper height, and upon the plate K is placed a can with its cover formed as shown in Fig. 8. The lever I is then depressed, which raises the plate K and drives the end of the can b into the chuck K', which is in motion. Said chuck K' fits snugly into the cover b, and by its friction causes the can and cover and plate K to revolve on the spindle F. If, now, the lever I is depressed still further, it will push the top of the can into the space between the formers f and g. The former f now turns down the flange against the body of the can, and at the same time the rod t, lever r, and starter q move, and thus start the nut o on the worm p, which then moves the lever n and its attached rack l, which now works the pinion k, until one end of the slot j strikes the feather i, and this then causes the shaft d, with its head e, to revolve gradually from the position shown in Fig. 1 to that shown in Fig. 2. When the head e is in the position shown in Fig. 2 the lever I is again further depressed, so as to cause the can to rise out of the space between the formers f and g, during which time the nut o has run to the end of the worm and is returning back, thus causing a reverse motion of the rack l and pinion k, but without producing any motion in the shaft d until the other end of the slot j strikes the feather i, and then gradually brings the head e back to its starting-point. During the reverse motion of the head e, while the can is in the position last described, the wheel f depresses the partly-formed seam against the can and finishes it, particularly while the wheel f is in the position shown in Fig. 3, and the motion of the head e, which brings it back to its starting-point and at rest. During the last part of this motion the lever I is raised, thus dropping the support K of the can, and the wheel f, pressing on top of the finished seam, presses the can from the chuck, and it drops out of the machine. The outer edge of the wheel f is so placed that it just revolves in a minute arc around the axis of the shaft d, just allowing for the thickness of the metal. In so forming a double seam the wheel f supports the parts, while the flange c is turned down, and then in turn the wheel g supports while the wheel f turns down the double seam, and finally finishes it, as described.

When cans of different sizes are to be made the adjustable slide E is moved in or out to its proper place, so that the wheel g will come in contact with the can, as shown, and the rack l is released from and newly adjusted to the lever n. It will be observed that the axis of the shaft d is in a plane at right angles to a plane through the axis of the can, and the wheels f and g work in the plane of the latter and normal to the can, which is their best position.

It may also be seen that the head e may be carried in a bracket concaved so as to receive it and allow it to play, and thus dispense with its shaft, and the head e may be moved by hand so as to do the same work.

The worm p is preferably attached to the driving-shaft; but it might with about equal facility be attached to the shaft u, and while the worm mechanism is preferred, other and well-known contrivances to work the head e may be substituted.

Having thus described my invention, what I claim is—

1. In a seaming-machine, the head e, carrying formers f and g, said head operating in a plane through the axis of the can, formed and constructed to operate substantially as specified.

2. In a seaming-machine, the adjustable head e, carrying formers f and g, shaft d, pinion k, rack l, lever n, nut o, worm p, starter q, shaft u, provided with feather v, and adjustable plates K K', substantially as specified.

3. The post A and dovetailed and adjustable bracket B, provided with spindle F, and rack G, pinion H, and bolt B', substantially as specified.

4. In a seaming-machine, the adjustable shaft u, chuck K', spindle F, plate K, head e, carrying formers f and g, worm p, and mechanism whereby said head is operated, substantially as specified.

5. In a seaming-machine, the adjustable head e, carrying formers f and g, shaft d, pinion k, rack l, and mechanism attached to one of the driving-shafts, whereby a rocking motion is given to the head e, substantially as specified.

6. In a seaming-machine, the spindle F, operated by rack and pinion, plates K K', shaft u, provided with feather v, rod t, lever r, starter q, and mechanism, substantially as described, whereby a rocking motion is given to the head e, substantially as specified.

FRANCIS A. WALSH.

Witnesses:
WM. ZIMMERMAN,
JOHN EGAN.